US006345940B2

(12) United States Patent
Anjanappa et al.

(10) Patent No.: US 6,345,940 B2
(45) Date of Patent: Feb. 12, 2002

(54) CUTTING TOOLS FOR DRILLING CONCRETE, AGGREGATE, MASONRY OR THE LIKE MATERIALS

(75) Inventors: Muniswamappa Anjanappa, Columbia; Stephen R. Crosby, White Hall; Russell M. Timmons, Lutherville, all of MD (US); John D. Williams, Champaign, IL (US)

(73) Assignees: Black & Decker Inc., Newark, DE (US); University of Maryland Baltimore County, Baltimore, MD (US)

( * ) Notice: Subject to any disclaimer, the term of this patent is extended or adjusted under 35 U.S.C. 154(b) by 0 days.

(21) Appl. No.: 09/727,027

(22) Filed: Nov. 30, 2000

Related U.S. Application Data

(63) Continuation of application No. 08/837,828, filed on Apr. 22, 1997, now Pat. No. 6,174,111, which is a continuation of application No. 08/354,349, filed on Dec. 12, 1994, now abandoned.

(51) Int. Cl.[7] ............................................... B23B 51/02
(52) U.S. Cl. ..................... 408/230; 175/420.1; 175/428; 408/144; 408/227
(58) Field of Search .................. 408/1 R, 227, 408/229, 230, 144; 76/108.2; 175/57, 414, 415, 420.1, 425–428

(56) References Cited

U.S. PATENT DOCUMENTS 6,174,111 B1 * 1/2001 Anjanappa et al. .......... 408/1 R

OTHER PUBLICATIONS

Declaration and metrology inspection forms for Vermont American drill bits, filed in parent application on Aug. 9, 2000.*

* cited by examiner

Primary Examiner—Steven C. Bishop
(74) Attorney, Agent, or Firm—Harness, Dickey & Pierce P.L.C.

(57) ABSTRACT

A cutting tool (200, 202) has a longitudinally extending shaft portion (208) with a chucking part (204) and a cutting head (206). A cutting edge (220) is formed on the cutting head (206). The cutting edge (220) includes at least one cutting portion. A rake surface (224) is formed adjacent to at least one of the cutting portions (220) with the rake face being at a rake angle in the range from about −10° to about 10°. A clearance face (226) is formed adjacent to the at least one cutting portion opposite the rake face (224). The clearance face (226) is at a clearance angle in the range from about 10° to about 50°. An edge radius between the rake face and the clearance face is at a radius of from about 0.0003 to about 0.0040 inch.

21 Claims, 7 Drawing Sheets

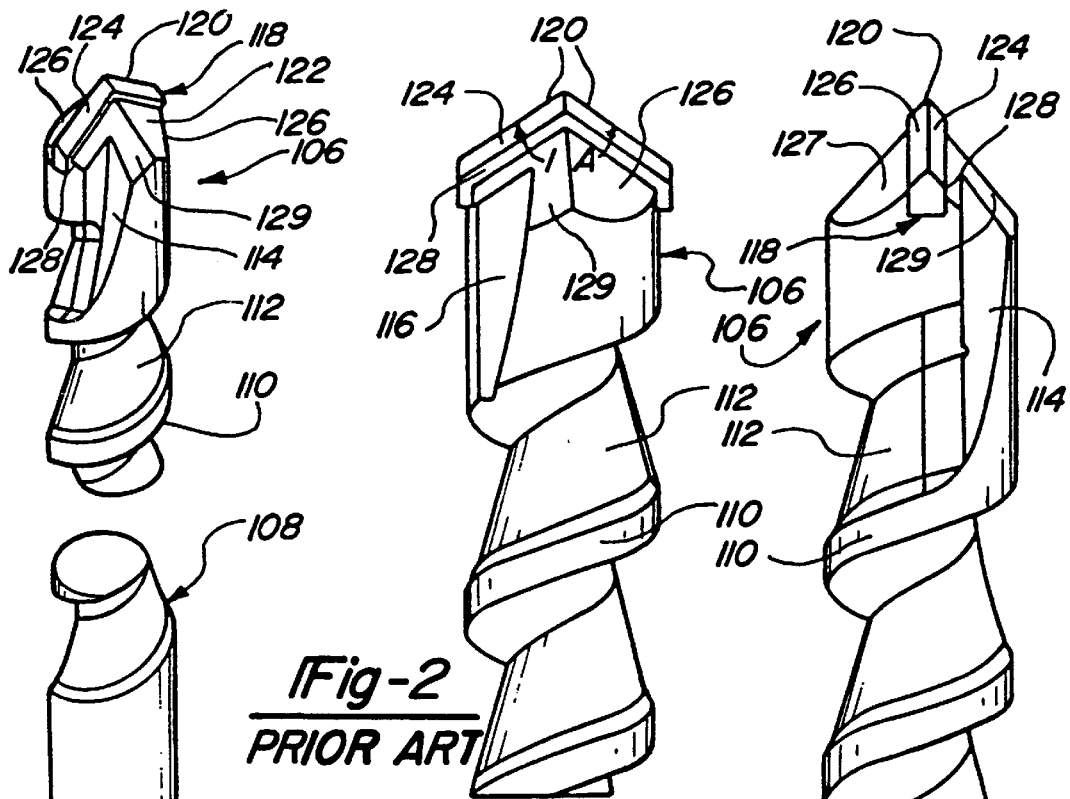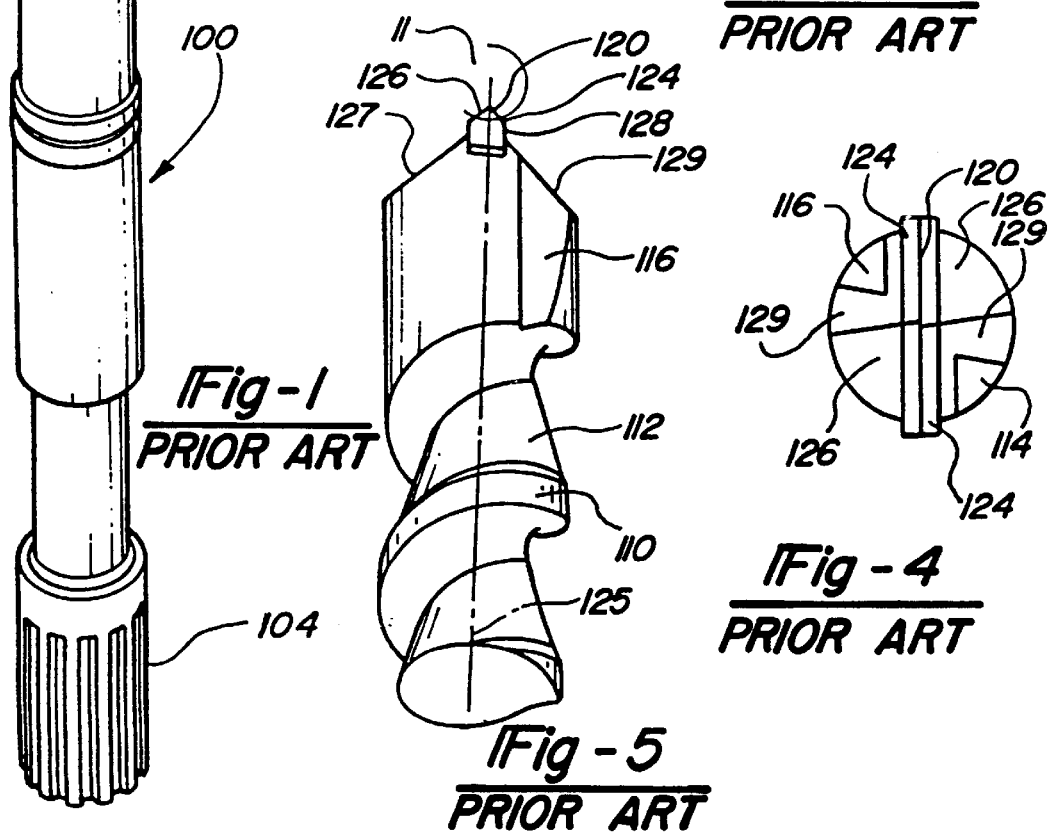

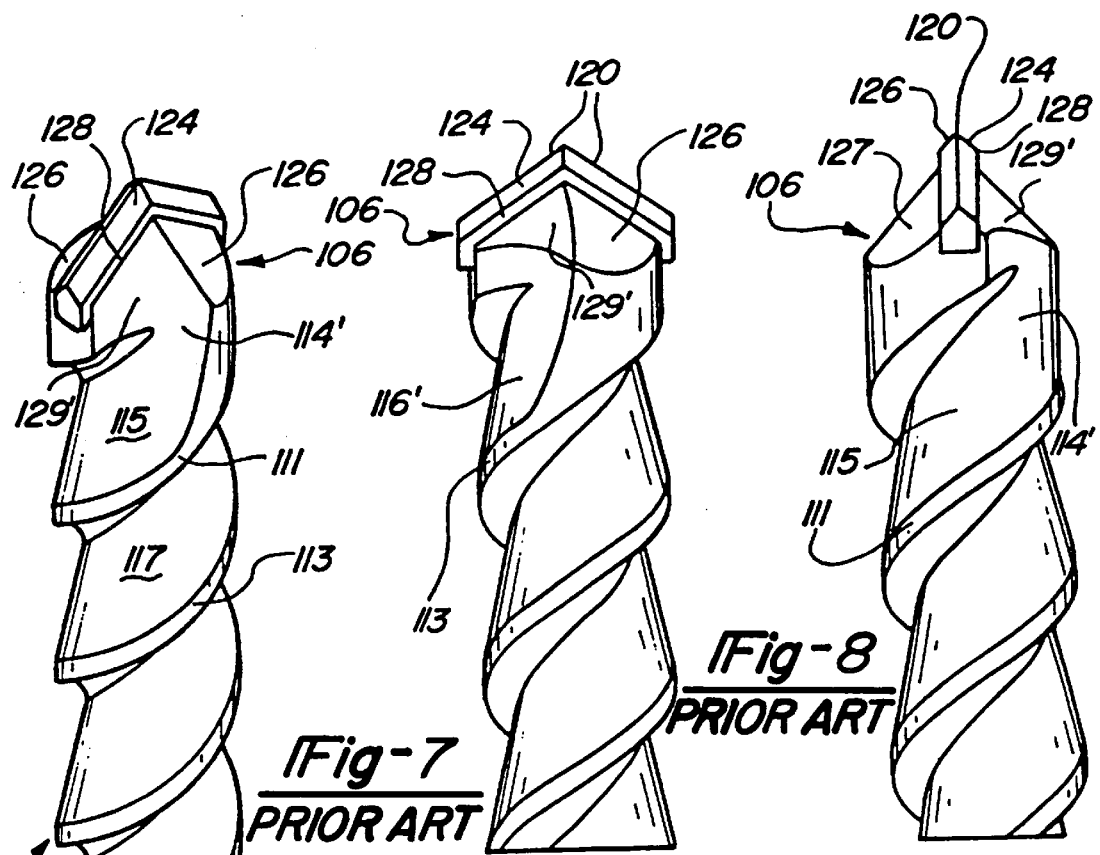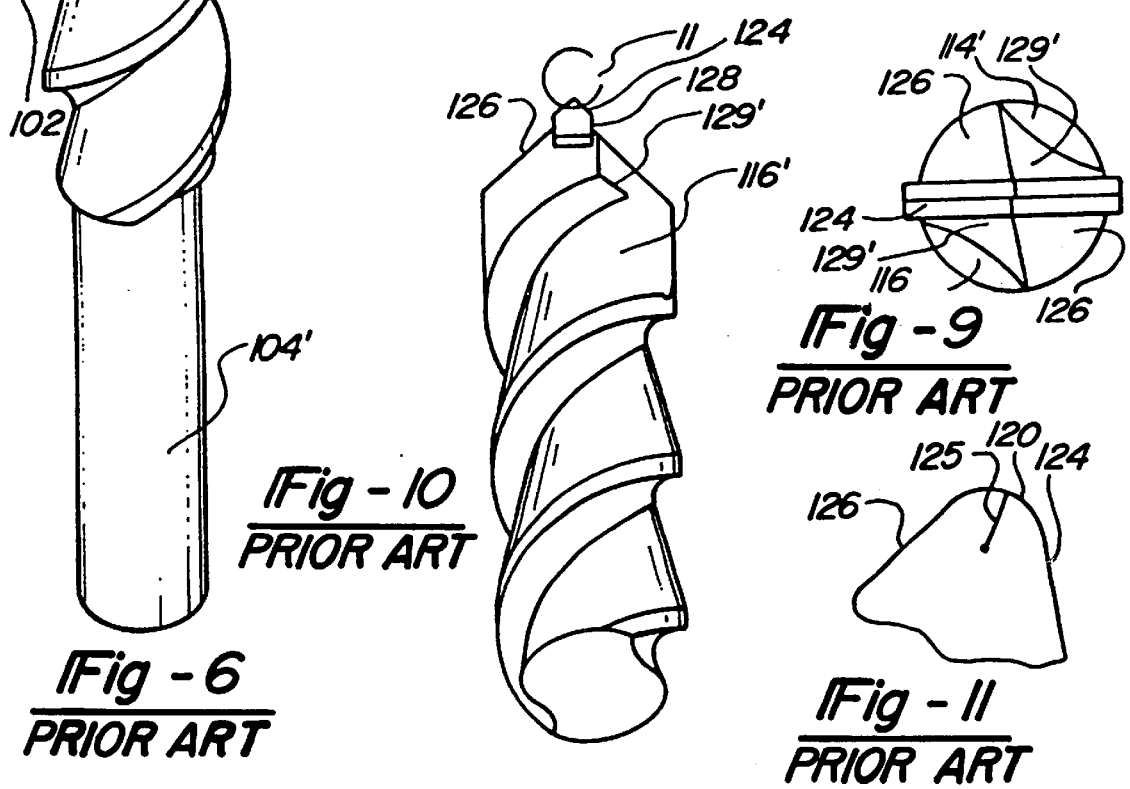

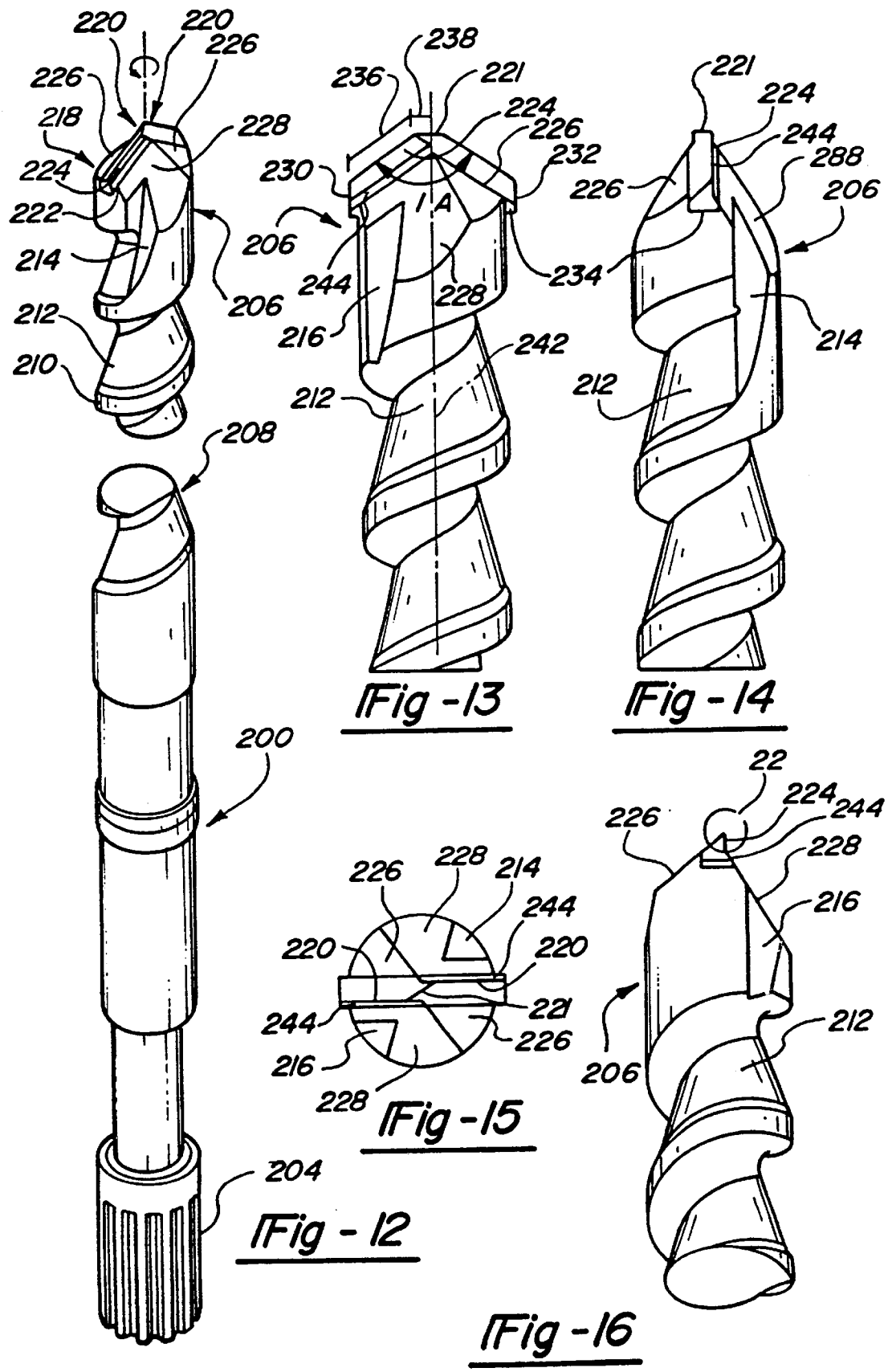

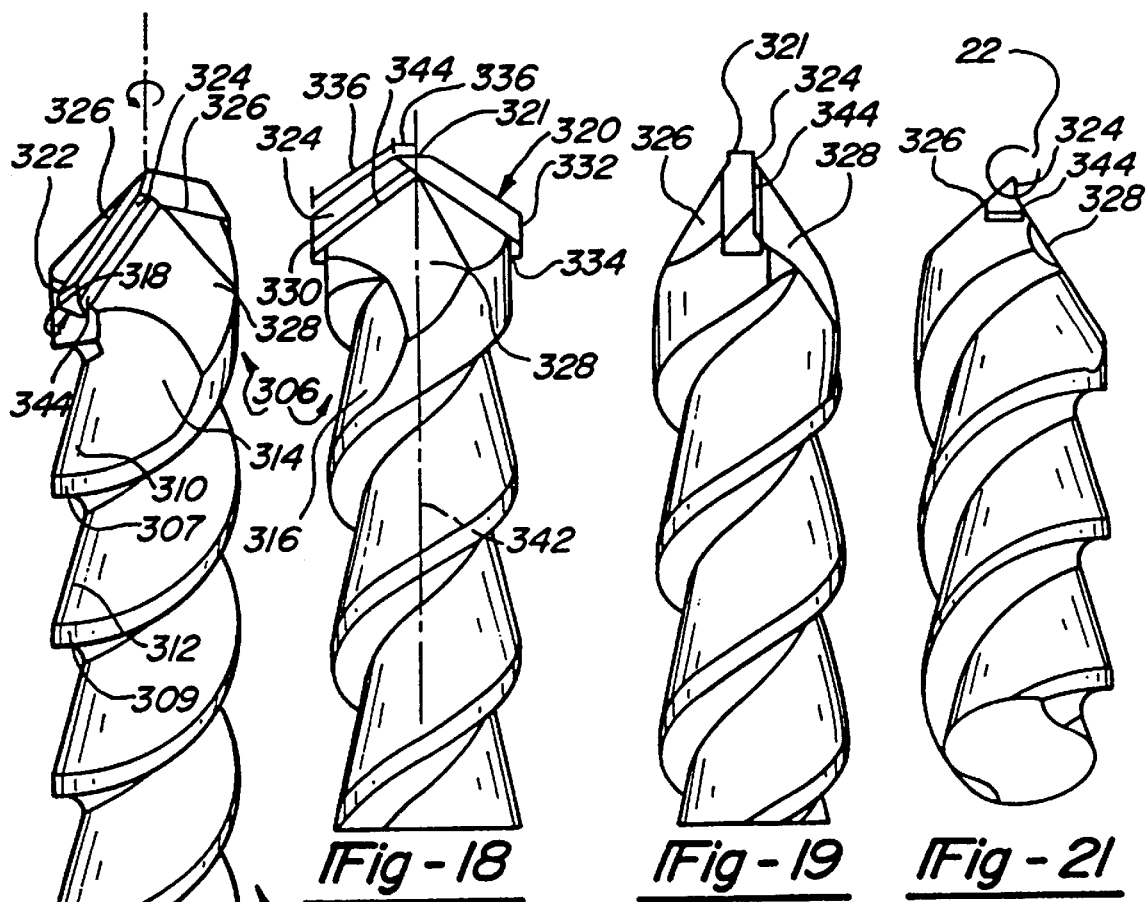
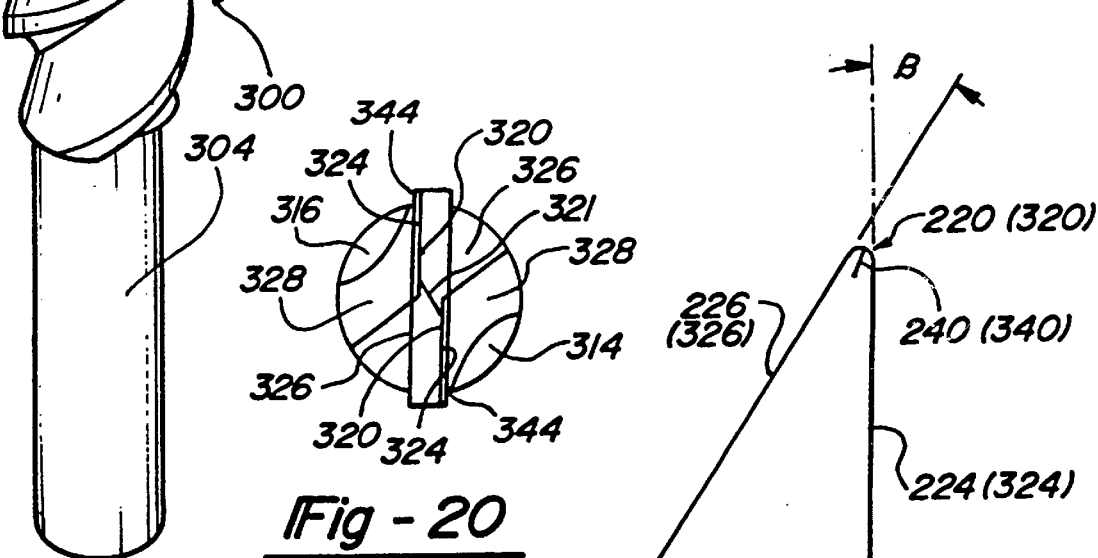

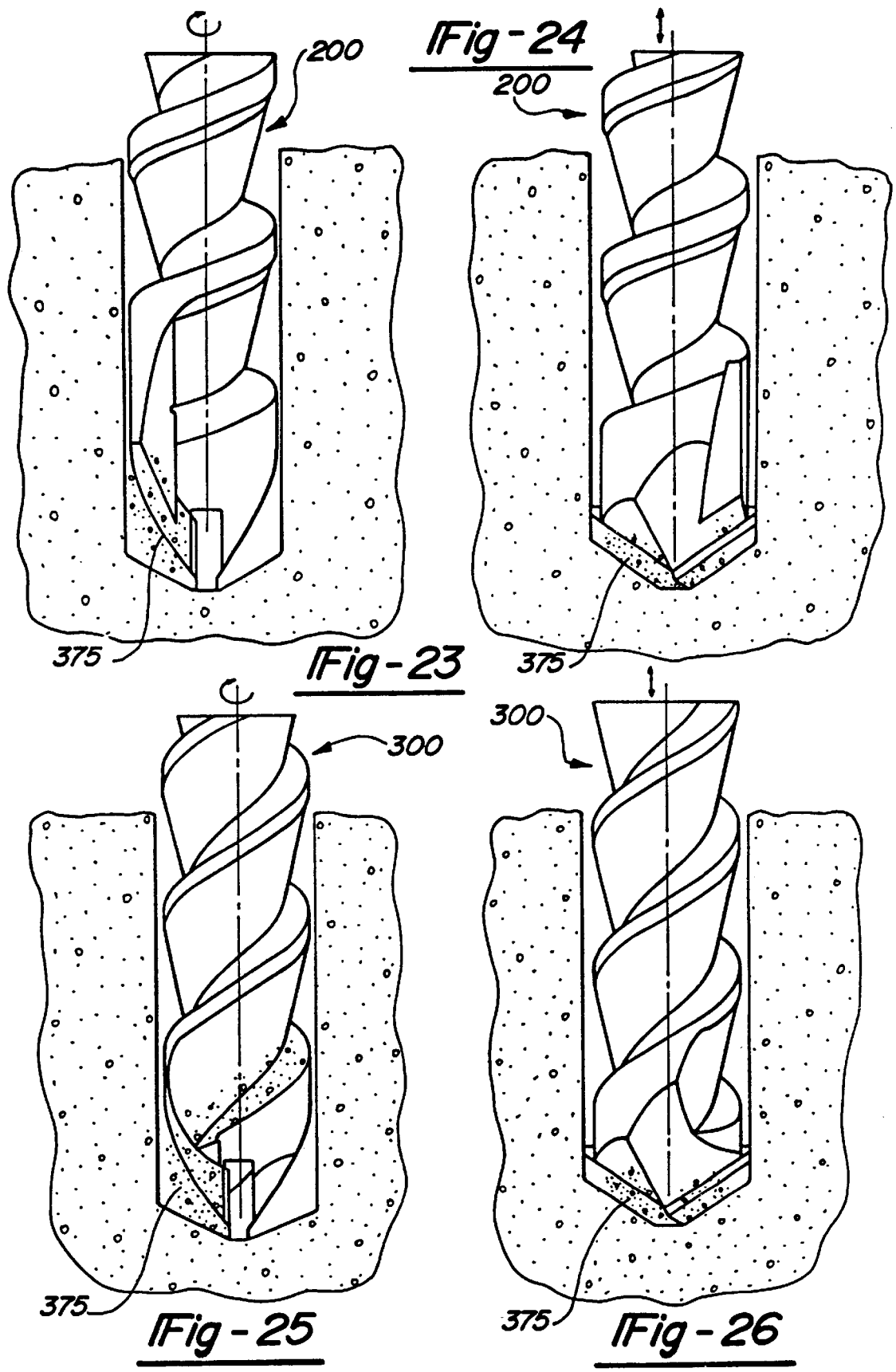

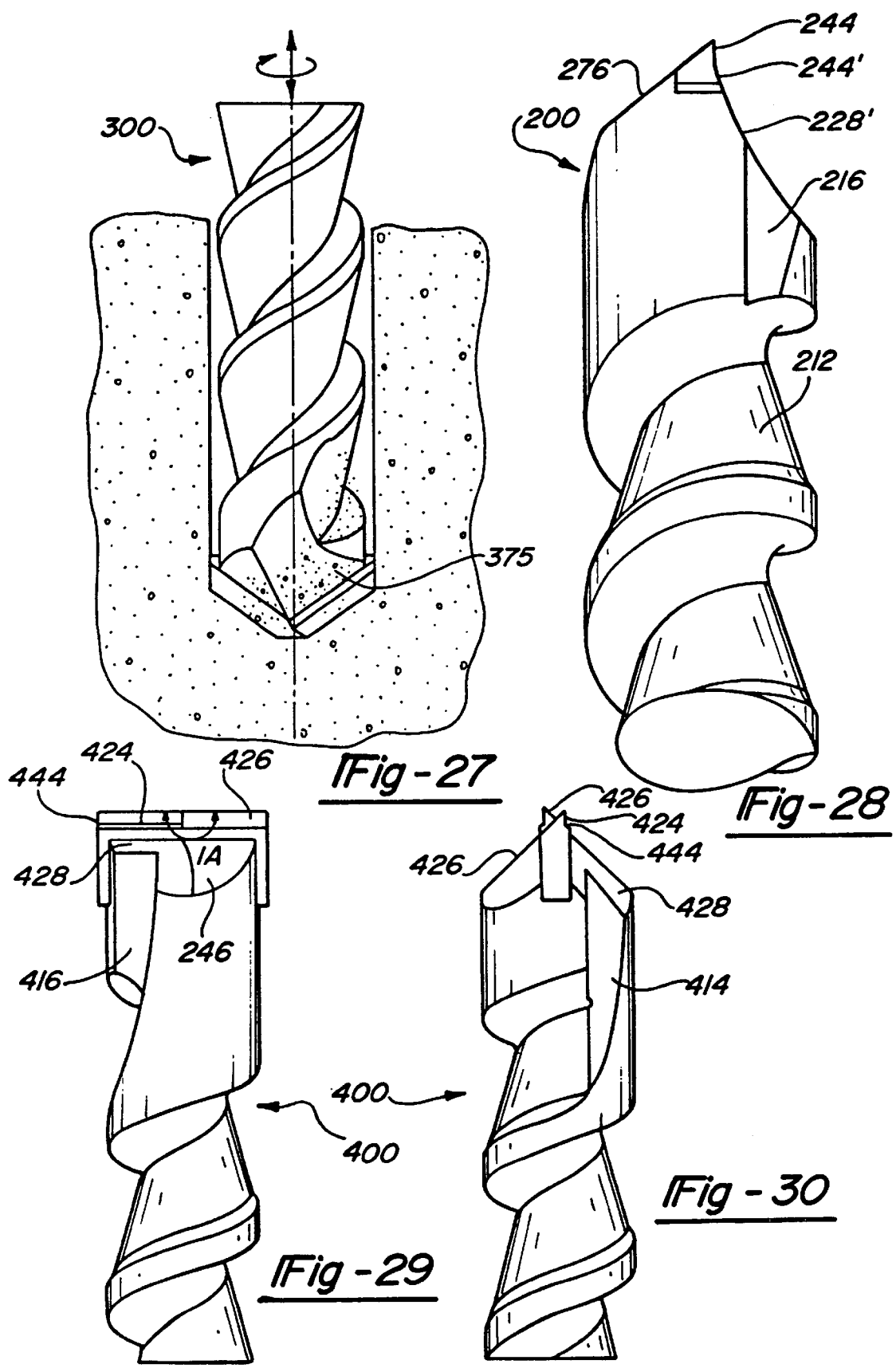

CUTTING TOOLS FOR DRILLING CONCRETE, AGGREGATE, MASONRY OR THE LIKE MATERIALS

CROSS-REFERENCE TO RELATED APPLICATIONS

This application is a continuation of U.S. patent application Ser. No. 08/837,828 filed Apr. 22, 1997, now U.S. Pat. No. 6,174,111, which is a continuation of application Ser. No. 08/354,349 filed Dec. 12, 1994 (now abandoned).

BACKGROUND OF THE INVENTION

The present invention relates to cutting tools or drill bits, and more particularly, to cutting tools which are used in hammering, percussive, or rotary boring or drilling applications in concrete, aggregate, masonry or the like material.

When drilling concrete, aggregate or the like materials, generally three different types of cutting tools or bits are used. These bits can be defined as hammer bits, percussive bits, and rotary masonry bits. In a true hammer bit, the bit is placed into a driver which includes a hammer which is sequentially and repetitiously moved toward and away from the bit. This hammering action hammers the bit. While the bit is being hammered, the bit continues to either passively or actively rotate. Thus, this type of cutting would be synonymous with using a chisel and hitting it with a hammer. Also, the driver may include a rotational feature where the bit is hammered and actively rotated.

In percussive drilling, the drive includes a chuck which is associated with stepping cam surfaces on gears which are rotated and, at the same time, moved up and down within the driver. Thus, the entire chuck mechanism rotates and moves up and down during the cutting process.

A rotary masonry bit is positioned into a driver which provides only a rotary movement. Thus, the rotary masonry bit does not move up and down and just rotates to cut at the concrete or aggregate.

Cutting tools in these three fields require different parameters for each type of application. In hammer and percussive bits, which utilize a chiseling action, the tip cutting angle, which provides tip strength, debris elimination and a cutting or rake face are a primary concern. Likewise, in rotary masonry drilling, which uses purely rotary movement, the cutting or rake face, debris clean out and cutting angle are also of primary importance. However, all of these elements are interrelated to provide an optimum cutting tool or drill bit to drill concrete, aggregate and the like materials.

Existing hammer and percussive cutting tools ordinarily include carbide insert tips with cutting edges which have large obtuse included angles as well as a negative rake face at large acute angles. Thus, the tip has been utilized to chisel and rotate to drill or bore into the concrete material. The rotary masonry bits ordinarily use a rake face on the bit so that when it is rotated, it will bore through the concrete material.

Further, when the carbide tips are formed, the carbide powder is pressed into a mold to form the tip. This tip is inserted directly and welded or brazed onto a tool shank. Thus, this is the art accepted way to form current design tools or bits.

SUMMARY OF THE INVENTION

Accordingly, it is an object of the present invention to provide the art with a cutting tool or bit which will reduce the time to drill holes into concrete, aggregate or the like material and improve the quality of the hole. The present invention has an improved cutting tip with a rake face which is slightly negative, zero or positive. The tip cutting angle, which is the angle between the rake face and clearance face, is smaller than current designs to provide better chiseling action. The debris recess of the present invention rapidly ejects debris from the tip into the helical flutes. A rake face on the cutting tools increases cutting action during rotation of the cutting tools in the hole.

Also, the present invention works the formed carbide tip, contrary to conventional teaching, to increase performance of the tip in drilling concrete, aggregate, masonry or the like material. The term "works" means the tip is ground or otherwise machined to sharpen or form a sharpened cutting edge on the tool. Further, in a tool with a ball head the present invention defines a larger egress space than is conventionally taught. "Egress space" is defined as the open volume through which debris may pass on its way from being created, to the flute of the bit to enable fast removal of debris.

In accordance with one aspect of the invention, a cutting tool comprises a longitudinally extending shank portion which defines a longitudinal axis and two ends. One end has a chucking part and the other end has a cutting head. A cutting edge on the cutting head includes at least one cutting portion. A rake surface is formed adjacent to at least one of the cutting portions. Also, a clearance face is formed adjacent to the at least one cutting portion opposite the rake face. An edge radius is formed between the rake face and the clearance face and has a radius from about 0.0005 to 0.001 inch. Likewise, a method of forming, by drilling or boring a hole in concrete, aggregate or the like material is disclosed using the above cutting tool. The cutting edge of the cutting tool is placed in contact with the concrete, aggregate or the like material. The cutting tool is rotated to form a hole in the material. Alternately, instead of rotating the tool, the tool may be impacted to chisel away the material to form the hole. Optionally both rotating and impacting may be conducted simultaneously.

In accordance with a second aspect of the invention, a cutting tool includes a longitudinally extending shank with a chucking end and a cutting head. A cutting edge is formed in the cutting head with at least one cutting edge portion. A rake surface is formed adjacent to at least one of the cutting portions with the rake face at an angle of from about $-10°$ to $10°$. A method of forming, by boring or drilling, a hole in concrete, aggregate or the like material is disclosed using the above cutting tool. The cutting edge of the cutting tool is placed in contact with the material. The cutting tool is rotated to form a hole in the material. Alternatively, instead of rotating the tool, the tool may be impacted to chisel away the material to form the hole. Optionally both rotating and impacting may be conducted simultaneously.

In accordance with a third aspect of the invention, a cutting tool includes a shank portion with a chucking end and a cutting head. The head includes a cutting edge with at least one cutting edge portion. A rake surface is formed adjacent to at least one cutting edge portion. Additionally, a clearance surface is formed adjacent to the at least one cutting portion opposite the rake face. One or both the rake surface and clearance surface are worked to form a sharpened edge radius. A method of forming, by boring or drilling a hole in concrete, aggregate or the like material is disclosed using the cutting tool. The cutting edge of the cutting tool is placed in contact with the material. The cutting tool is rotated to form a hole in the material. Alternatively, instead of rotating the tool, the tool may be impacted to chisel away the material to form the hole. Optionally both rotating and impacting may be conducted simultaneously.

In accordance with a fourth aspect of the invention, a cutting tool comprises a longitudinal shank with a chucking part at one end and a cutting head at the other end. The cutting head includes a cutting edge with at least one cutting edge portion. A rake surface is formed adjacent to the at least one of the cutting edge portions. A primary egress surface is formed immediately adjacent the rake surface such that the rake surface and primary egress surface define a new egress path. A method of forming, by boring or drilling, a hole in concrete aggregate or the like material is disclosed using this cutting tool. The cutting edge of the cutting tool is placed in contact with the material. The cutting tool is rotated to form a hole in the material. Alternatively, instead of rotating the tool, the tool may be impacted to chisel away the material to form the hole. Optionally both rotating and impacting may be conducted simultaneously.

In accordance with a fifth aspect of the invention, a cutting tool comprises a longitudinally extending shank with a chucking part at one end and a cutting head at the other end. The cutting head includes a cutting edge with at least one cutting edge portion. A rake surface is formed adjacent to the at least one cutting edge portion. The rake surface includes a worked portion which extends from the cutting edge portion to define a length of relief. The ratio of the depth of the length of relief to tool diameter is in a range of about 0.10 to 0.32 inches per inch diameter of the tool. A method of forming, by boring or drilling, a hole into concrete, aggregate or the like material is disclosed using the above cutting tool. The cutting edge of the cutting tool is placed in contact with the aggregate. The cutting tool is rotated to form a hole in the material. Alternatively, instead of rotating the tool, the tool may be impacted to chisel away the material to form the hole. Optionally both rotating and impacting may be conducted simultaneously.

Additional objects and advantages of the invention will be apparent from the detailed description of the preferred embodiment, the appended claims and the accompanying drawings, or may be learned by practice of the invention.

BRIEF DESCRIPTION OF THE DRAWINGS

The accompanying drawings, which are incorporated in and constitute a part of the specification, illustrate two embodiments of the present invention and together, with the description, serve to explain the principles of the invention. In the drawings, the same reference numeral indicates the same parts.

FIG. 1 is a perspective view of a prior art cutting tool, with a portion omitted for clarity.

FIG. 2 is a partial side elevational view of the cutting tool of FIG. 1.

FIG. 3 is a partial side elevational view, rotated 90°, of the cutting tool of FIG. 1.

FIG. 4 is a top plan view of the conventional cutting tool of FIG. 1.

FIG. 5 is an auxiliary view along the cutting edge of the conventional cutting tool of FIG. 2 illustrating the rake surface.

FIG. 6 is a perspective view of another prior art cutting tool.

FIG. 7 is a partial side elevational view of the cutting tool of FIG. 6.

FIG. 8 is a partial side elevational view, rotated 90°, of the conventional cutting tool of FIG. 6.

FIG. 9 is a top plan view of the conventional cutting tool of FIG. 6.

FIG. 10 is an auxiliary view along the cutting edge of the conventional cutting tool of FIG. 7 illustrating the rake surface.

FIG. 11 is an enlarged side elevational detail view of a cutting edge radius of the conventional cutting tool shown by circle 11 of FIGS. 5 and 10.

FIG. 12 is a perspective view of a cutting tool in accordance with the present invention, with a portion omitted for clarity.

FIG. 13 is a partial side elevational view of the cutting tool of FIG. 12.

FIG. 14 is a partial side elevational view, rotated 90°, of the cutting tool of FIG. 12.

FIG. 15 is a top plan view of the cutting tool of FIG. 12.

FIG. 16 is an auxiliary view along the cutting edge of the cutting tool of FIG. 12 illustrating the rake surface.

FIG. 17 is a perspective view of an alternate embodiment of the cutting of the present invention.

FIG. 18 is a partial side elevational view of the cutting tool of FIG. 17.

FIG. 19 is a partial side elevational view, rotated 90°, of the cutting tool of FIG. 17.

FIG. 20 is a top plan view of the cutting tool of FIG. 17.

FIG. 21 is an auxiliary view along the cutting edge of the cutting tool of FIG. 17 illustrating the rake surface.

FIG. 22 is an enlarged side elevational detail view of the cutting edge radius of the cutting tool shown in circle 22 of FIGS. 16 and 21.

FIG. 23 is a side elevational schematic view, partially in section, of the cutting tool of FIG. 12 rotating within a material.

FIG. 24 is a view like FIG. 23, but with the cutting tool impacting or chiseling the material.

FIG. 25 is a partial cross section of a side plan view of the cutting tool of FIG. 17, rotating in the material.

FIG. 26 is a figure like that of FIG. 25, but with the cutting tool impacting or chiseling the material.

FIG. 27 is a figure like that of FIG. 25, but with the cutting tool both rotating and impacting or chiseling the material.

FIG. 28 is an auxiliary view taken along the cutting edge of a cutting tool of an alternate embodiment illustrating an arcuate first egress surface and area.

FIG. 29 is a partial side elevational view of another embodiment of a cutting tool, with an 180° included angle.

FIG. 30 is a side elevational view like FIG. 29, rotated 90°.

DESCRIPTION OF PRIOR ART DRAWINGS

Figure 10A:
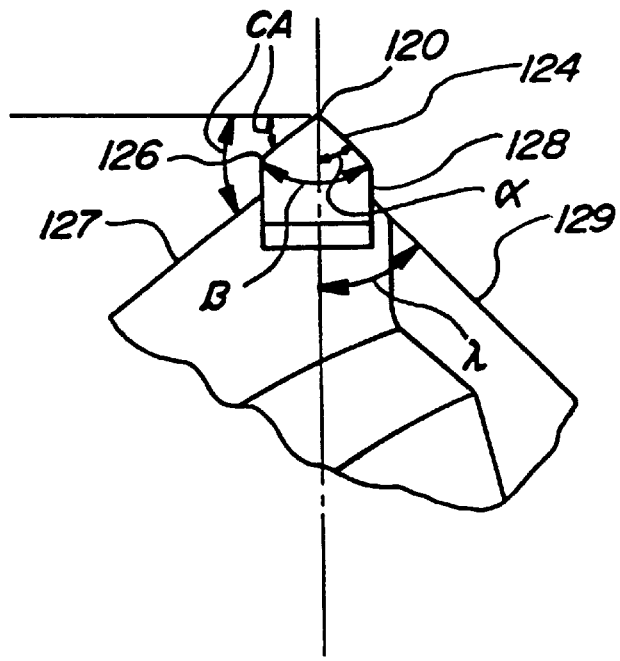
FIG. 10A is a partial enlarged view of the tip of FIG. 10.

Turning to FIGS. 1 through 11, two prior art cutting tools are illustrated. FIGS. 1 through 5 illustrate a ball head single flute cutting tool, while FIGS. 6 through 10 illustrate a double helix cutting tool. FIG. 11 illustrates the cutting edge radius of both the cutting tools.

When defining angle measurements, it is important to use ture angles. "True angles" are taken by defining a reference plane parallel to the center line of the tool and through the cutting edge in an auxiliary view with the cutting edge as a point. See for example, FIGS. 5, 10, 16 and 21. The rake angle, designated by α, is the angle measured from the defined reference plane to the rake face. The clearance angle, designated by CA, is the complement of the angle measured from the defined reference plane to the clearance face. The cutting angle, designated by β, is the angle between the clearance face and rake face. The cutting angle β for negative rake angles is $(90-CA)+|\alpha|$, and for positive rakes angles is $(90-CA)-|\alpha|$. The egress angle, designated by λ, is the angle from the defined reference plane to the egress face. Positive rake and egress angles are defined by clockwise rotation about a point on the cutting edge from defined reference plane at the cutting edge to the rake face, when viewed along the cutting edge from the outside diameter of the bit. Negative rake and egress angles are defined by counterclockwise rotation about a point on the cutting edge from the defined reference plane to the rake face, when viewed along the cutting edge from the outside diameter of the bit. Rake angles are measured in the zone between the cutting edge and the chucking end of the bit. Rake angles are measured in the area between the cutting edge and the chucking end of the bit.

The conventional ball head single helix cutting tool is designated with the reference numeral 100 and the conventional double helix tool is designated with the reference numeral 102. Referring to FIGS. 1 through 5, the single flute cutting tool 100 has a chucking end 104 for a hammer driver and a ball cutting head 106. The shank 108 has the single helix 110 defining a flute 112. The flute 112 ends at the cutting head 106 at a debris channel 114. Also, an additional debris channel 116 is cut into the opposing side of the head, which dumps directly into the flute 112, as seen in FIG. 3.

The cutting head 106 includes an insert 118, which includes a cutting edge 120, either brazed or welded or the like into a slot 122 in the cutting head 106. The insert is formed by sintering (placing powdered carbide into a mold and compressing it).

The cutting edge 120 is defined, on the insert, by rake faces 124, edge radius 125 FIG. 11, and clearance faces 126. Also, a clearance face 127 is formed on the shank, which may be at the same angle as clearance face 126. Ordinarily, as shown in FIG. 5, first egress faces 128 are directly adjacent to the rake faces 124, and egress area 129 forms the remainder of the egress portion. The egress area 129 may be on the same angle as the rake faces 124. The rake angle, measured with respect to the reference plane 125 is negative and is about –30° to about –40°. The rake faces 124 have a substantial negative rake angle with the exception of some percussive and rotary-only bits which are at 0°. The first egress faces 128 lead into the debris channels 114, 116. The edge radius 125, as can best be seen in FIG. 11, is between the rake faces 124 and clearance faces 126 and, as can be seen, is relatively dull and is on the order of 0.004 to 0.008 inch as measured on some prior art examples. However, while rotary-only bits may have 0° rake angles, the edge radius is in the mentioned range. Also, the rake face 124 and clearance face 126 define a cutting edge angle between the two surfaces. The cutting angle is an important factor in the chiseling action and in conventional ranges from about 45° to 110°. Thus, with the negative rake angle and the dull edge radius, a conventional cutting tool 100, 102, as it rotates, glides inside the hole, analogous to spreading butter with a knife, smoothing away debris within the hole. One drawback is that it requires substantial force to initiate cutting of the hole in concrete, aggregate or the like material.

Referring now to FIGS. 6 through 10, in the double helix cutting tool 102, the chucking end 104' shown is differently from that of the single flute cutting tool 100, a rotary or percussive-type chucking end so that it can be illustrated. The tool includes helixes 111 and 113 as well as flutes 115 and 117. The debris channels 114 and 116 are formed at the end of each of the flutes at the cutting head 106.

The cutting tip insert 118 is the same as that previously described and the rake faces 124, cutting edge 120 and, clearance surfaces 126 are identified with the same numbers. However, the egress area 129' is different than that in the single flute design due to less head material in the double helix design.

Here, the egress area is parallel to the rake face. Also, the debris channels 114', 116' are similar.

Both of these cutting tools illustrate a cutting tip having a large obtuse included angle between the two cutting edges on the order of 120° to 130°. Also, the egress angle, ordinarily about 30° to 35°, defining the plane of the egress area, is relatively shallow. Likewise, the clearance angle, ordinarily about 20° to 30°, which defines the plane of the clearance surfaces 126, 127 is also shallow. Also a cutting edge angle, between the rake face and clearance face, is ordinarily about 90° to 110°.

DETAILED DESCRIPTION OF THE PREFERRED EMBODIMENT

Turning to FIGS. 12 through 26, embodiments of the present invention are shown. FIGS. 12 through 16 illustrate a single helix design, designated with the reference numeral 200, and FIGS. 17 through 21 illustrate a double helix design, designated with the reference numeral 300, respectively.

The single helix cutting tool 200 includes a chucking end 204, in this particular case illustrated as a spline for a hammer driver. Note, however, that a percussive and/or a cylindrical rotary end or other attachment and drive means could be used. A cutting head 206 is at the other end of the cutting tool 200 and a shank 208 is between the two ends. The helix 210 defines a flute 212. The flute 212 terminates at the cutting head 206 into a first debris channel or recess 214. Likewise, a second debris channel or recess 216 is cut into the other side of the cutting head 206 opposing the recess 214 and it dumps into flute 212 as seen in FIG. 16.

The cutting head 206 includes an insert 218 which includes cutting edge 220, rake faces 224, and clearance faces 226. Likewise, egress faces 228 are immediately adjacent the rake faces 224. In elevation, the insert 218 has an overall pentagonal shape of a house with the cutting edge 220 defining the roof, and having sides 230 and 232, and a base 234, which is substantially perpendicular to the two parallel sides 230 and 232. On the other hand, the cutting edge of the present invention could be continuous along a straight line to provide a rectangular insert, as seen in FIGS. 29 and 30. In this embodiment, corresponding reference numerals are increased by 200. Thus, the cutting tool is designated with the reference numeral 400.

Returning to the embodiment shown in FIGS. 12 through 16, the insert 218 is brazed, welded or the like into the slot 222 in the cutting head 206. The insert 218 is generally manufactured from a carbide material, such as carbide or tungsten carbide. However, ceramics, ceramic composites, diamond dust, metal ceramic composites, a unitary tip homogeneous with the tool shank, or a deposit of hard layers could be used. Also, the entire cutting tool could be manufactured from such material or a portion thereof, including the head 206 manufactured from such a material, eliminating the insert 218.

The cutting edges 220 are defined by rake faces 224, edge radius 240 (FIG. 22) and the clearance faces 226. The cutting edges 220 include a primary cutting edge 236 and a secondary cutting edge 238. The primary cutting edge 236 is at an acute angle with respect to the longitudinal axis 242, while the secondary cutting edge 238 is substantially perpendicular to the longitudinal axis 242.

The cutting edges 220 include edge radius 240 between the rake faces 224 and clearance faces 226 (see FIG. 22). As noted above, the edge radius 240 defines the "sharpness" of the cutting tool. An edge radius 240 of the present invention generally ranges from between about 0.0003 to 0.0040 inch and preferably between 0.0005 to 0.001 inch. A desired edge radius 240 provides a desired sharpness to enable the cutting tool to cut through the concrete, aggregate or the like material during rotation of the cutting tool. The edge radius is formed by working, such as by grinding or the like, the clearance face 226 and the rake face 224.

The two cutting edges 220 form a tip or point 221 between them. The included angle (IA) between the two cutting edges 220 is from about 90° to 180° and preferably in the range from about 100° to 160°.

As shown, for example, in FIG. 15, the cutting edges 220 are offset from the longitudinal axis 242 of the cutting tool 200. The rake faces 224 are worked or ground into the insert and define rake angles a as defined above. Generally, the rake angle a is between about 10° to −10°, preferably at about 0° for the primary cutting edge portion 236. Thus for the primary cutting edge portion, 236, the worked rake faces 236, are substantially parallel to the longitudinal axis 242. On the other hand, the rake angle is between about −50° to −20°, preferably to about −40°, for the secondary cutting edge portion 238.

The rake faces 224 are formed by working, such as grinding or the like, both sides of the insert 218, and extend a desired distance from the cutting edge 220. The distance or depth which the rake faces 224 extend from the cutting edge is known as the "length of relief". The depth of the length of relief is measured from the cutting edge 220 along the longitudinal axis 242 to a first egress surface 244. The length of relief of the rake faces 224 has a depth of about 0.08 inch to about 0.25 inch for a ¾ inch diameter bit. Preferably, the depth is from about 0.15 to about 0.25 inch. The length of relief can be defined as a ratio with respect to the diameter of the tool. Thus, the length of relief ratio is about 0.10 to about 0.32 inches per inch diameter of the tool.

Figure 21A:
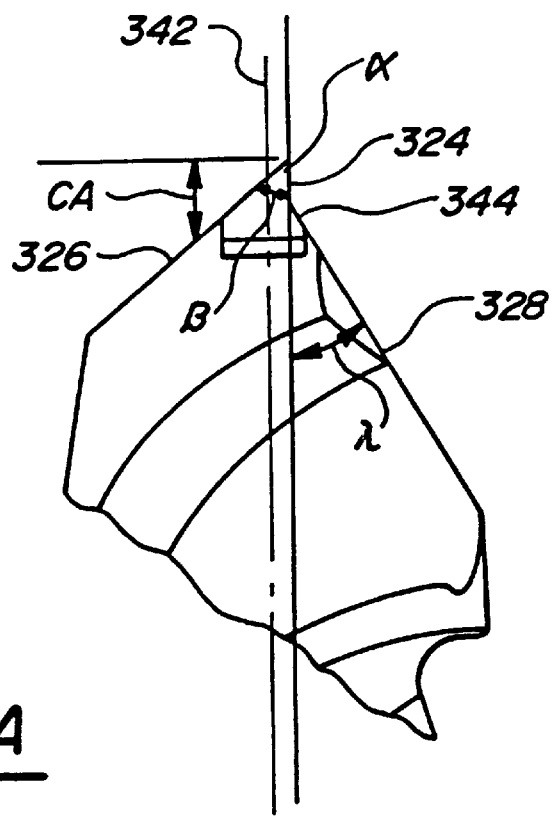
FIG. 21A is a partial enlarged view of the tip of FIG. 10.

The first egress surface 244 angles from the terminus or end of the rake surface 224. The first egress surface 244 is generally angled with respect to the rake face 224, providing an overall stepped cutting head, as seen in FIGS. 16 and 21. The angle of the first egress surface 244 is from about 30° to 90° and preferably about 55° to 60° and may be continuous with and at the same angle as the egress area 228.

The clearance surface 226, which includes a portion of the insert 218 and the cutting head 206, defines a clearance angle CA. The clearance angle CA is defined as mentioned above. This clearance angle is from about 10° to about 50° and preferably about 20° to 40° for hammer and percussive tools and from about 30° to 50° for rotary-only tools.

A cutting edge angle β, as defined above and shown in FIG. 22, is defined between the clearance face 226 and rake face 224. The cutting edge angle β is from about 30° to 90° and preferably from about 40° to 60° for the primary cutting edge portion. The cutting edge angle for the secondary cutting edge portion varies from about 60° to 120°, and preferably from about 80° to 100°. These cutting edge angles define a primary cutting edge portion which enhances cutting edge action, while the cutting angle defined for the secondary cutting edge portion enhances the chiseling action of the cutting tool.

The egress area 228 defines an egress angle λ (FIG. 16) which is measured as mentioned above. The egress area 228 is adjacent to the first egress surface 244. The angle is at least 0° and preferably from about 30° to 60° for hammer and percussive tools. The range of the egress angle for rotaar-only tool is about −20° to 90° and preferably about −20° to 20°. Also, the first egress surface 244' and egress area 228' may be arcuate as seen in FIG. 28. Here they are shown on the same arc. However, they could be on different arcs. This egress area and surface enhance the transport of debris from the tool tip into the flute 212 of the shank 208. Thus, by providing a desired egress angle, debris is prevented from choking at the cutting head 206. As seen in FIGS. 12 through 16, a larger volume of material can be removed from the ball head than the conventional cutting tool, enabling better debris removal.

Turning to FIGS. 17 to 21, the difference in the head 306 in the egress area 328 and clearance surface 326 is due to a reduced amount of tool material present in the double helix design than is present in the single helix design. Otherwise, the angle parameters previously described are the same with respect to the double helix design as they are to the single helix design. The remaining portions of the cutting head 306 are designated with reference numerals increased by a hundred and the description is the same as in the first embodiment since these elements are the same. The double helix embodiment of the present invention is shown. The cutting tool 300 includes a chuck end 304 which is one example of a rotary or percussive type of cutting tool end. Also, the helixes 307 and 309 and flutes 310 and 312 are different from those previously described. The helixes 310 and 312 end at the cutting head 306, thus enabling the debris recesses 314 and 316 to include a larger volume of debris.

Turning to FIGS. 23 through 27, the cutting tools of the present invention are illustrated in action in concrete, aggregate or the like material, forming, by boring or drilling, a hole. When the terms "concrete", "aggregate" "or the like" material are used, for purposes of the present invention, they include, but are not limited to, cap block, brick, stone, ceramic materials, concrete, aggregate, blacktop, rock, cement, masonry or the like materials. In drilling a hole using rotary-only motion as indicated by the arcuate arrow (FIGS. 23 and 25), the bit of the present invention contacts the material without imparting any percussive energy. Here the rake face of the cutting tool forms a hole into the material. As seen in FIGS. 23 and 25, the swarf 375 is cut away from the material to form the hole and is directed along a path along the debris channel and, in turn, the flute due to the rotary movement. Alternatively, as shown in FIGS. 24 and 26, the cutting tool contacts the concrete, aggregate or the like material and impacts or chisels the material to form a hole as indicated by the up and down arrows. As seen in FIGS. 24 and 26, the swarf 375 is cut away from the material to form the hole and is randomly scattered due to impacts of the tool. Further, the cutting tool may contact the material, and both impacting and rotating movement, as seen by both the arcuate and up and down arrows, may be utilized together to form a hole as seen in FIG. 27. Here the swarf 375 is randomly scattered and directed along the debris channel and, in turn, the flutes due to the tool movement. Generally, in this mode both where percussion is used, the impacting is sequential and repetitious so that a constant repeating force is applied axially onto the cutting tool. Also, when the cutting tool is rotating only, a constant force may be applied to the driver.

To manufacture a cutting tool in accordance with the present invention, it would be made in methods consistent with those in the art. To provide a tip with surfaces like those disclosed, ordinarily the rake surfaces, egress surfaces and clearance surfaces would be ground or formed by other conventional means into the cutting tool to form the desired surfaces with desired angles.

While the above detailed description describes the preferred embodiment of the present invention, the invention is susceptible to modification, variation, and alteration without deviating from the scope and fair meaning of the subjoined claims.

What is claimed is:

1. A cutting tool for forming a hole in masonry material, comprising:
    a shank having a chucking end and a cutting head, an insert secured to said cutting head, a cutting edge on said insert, said cutting edge having at least one cutting edge portion;
    a rake face formed on said insert adjacent said at least one cutting edge portion, a clearance face adjacent said at least one cutting edge portion opposing said rake face, said clearance face being at a clearance angle from about 20° to 40° and said rake face being at a rake angle and said rake angle being from −10° to about 10° with an edge radius between the rake face and clearance face, said edge radius having a radius in the range of about 0.0003 inch to 0.0030 inch.

2. The cutting tool according to claim 1, wherein said cutting edge has at least two cutting edge portions, each include a rake surface.

3. A cutting tool for forming a hole in masonry material, comprising:
    a shank having a chucking end and a cutting head, an insert secured to said cutting head, a cutting edge on said insert, said cutting edge including at least one sharp cutting edge portion, a rake surface adjacent said at least one cutting edge portion, said rake face at a rake angle, said rake angle being from 0° to about 10°;
    a clearance face adjacent said at least one cutting edge portion opposing said rake face, and said sharp cutting edge portion defined by an edge radius between said rake face and clearance face, said edge radius having a desired radius.

4. The cutting tool according to claim 3, wherein said cutting edge has at least two cutting edge portions, each include a rake surface.

5. An insert for a cutting tool for forming a hole in masonry material, comprising:
    a body, a cutting edge on said body, said cutting edge having at least one cutting edge portion;
    a rake face formed adjacent said at least one cutting edge portion, a clearance face adjacent said at least one cutting edge portion opposing said rake face, said clearance face on a clearance angle from about 20° to 40° and said rake face being at a rake angle and said rake angle being in the range of from −10° to about 10° with an edge radius between the rake face and clearance face, said edge radius having a radius in the range of about 0.0003 inch to 0.0030 inch.

6. The insert according to claim 5, wherein said cutting edge has at least two cutting edge portions, each include a rake surface.

7. A cutting tool for boring masonry material comprising:
    a shank having a chucking end and a cutting head, an insert in said cutting head, a cutting edge on said insert and defined by an edge radius, said cutting edge including at least one cutting edge portion, said cutting edge portion formed on a rake face and a clearance face, said rake face at a rake angle from about −10° to 10° and said clearance angle from greater than 14° and said edge radius being smaller than 0.003 inch.

8. The cutting tool according to claim 7, wherein said clearance angle is from about 20° to about 40°.

9. The cutting tool according to claim 7, wherein said clearance angle is from about 25° to about 30°.

10. A cutting tool comprising:
    a shank having a chucking end and a cutting head, an insert in said cutting head, a cutting edge on said insert, said cutting edge including at least one cutting edge portion, said cutting edge portion formed on a rake face and a clearance face;
    said cutting edge being defined by an edge radius, said edge radius being smaller than 0.003 inch and said clearance face at a clearance angle from about 20° to 40°.

11. The cutting tool according to claim 10, wherein said rake face being at an angle from −10° to 10°.

12. The cutting tool according to claim 10, wherein said clearance face being at an angle from about 24° to 40°.

13. The cutting tool according to claim 10, wherein said clearance angle is from about 25° to 30°.

14. A cutting tool for forming a hole in a masonry material, comprising:
    a shank having a chucking end and a cutting head, an insert in said cutting head, a cutting edge on said insert, said cutting edge including at least one cutting edge portion, a rake surface adjacent said at least one cutting edge portion, said rake face at a rake angle between −10° to 10°;
    a clearance face adjacent said at least one cutting edge portion opposing said rake face, said clearance face being at an angle from greater than 14°, and said cutting edge portion defined by an edge radius between said rake face and clearance face, said edge radius having a desired radius providing a sharp edge.

15. The cutting tool according to claim 14, wherein said cutting edge being defined by an edge radius, said edge radius being smaller than 0.003 inch.

16. A cutting tool for forming a hole in a masonry material, comprising:
    a cutting head, a shank having a chucking end and an insert in said cutting head, a cutting edge on said insert, said cutting edge having at least one cutting edge portion;
    a rake face formed adjacent said at least one cutting edge portion, a clearance face adjacent said at least one cutting edge portion opposing said rake face, with an edge radius between the rake face and clearance face, said edge radius having a radius smaller than 0.003 inch and said clearance face being at an angle from about 24° to 40°.

17. The cutting tool according to claim 16, wherein said rake face being at an angle from −10° to 10°.

18. The cutting tool according to claim 16, wherein said clearance face being at an angle from about 25° to 35°.

19. The cutting tool according to claim 16, wherein said cutting edge being defined by an edge radius, said edge radius being smaller than 0.003 inch.

20. A cutting tool for forming a hole in masonry material, comprising:
    a shank having a chucking end and a cutting head, an insert secured to said cutting head, a cutting edge on said insert, said cutting edge including at least one sharp cutting edge portion, a rake surface adjacent said at least one cutting edge portion, said rake face at a rake angle, said rake angle being from −10° to about 10°;

a clearance face adjacent said at least one cutting edge portion opposing said rake face, said clearance face being on an angle from about 20° to 40° and said sharp cutting edge portion defined by an edge radius between said rake face and clearance face, said edge radius having a desired radius.

21. A cutting tool for forming a hole in masonry material, comprising:

a shank having a chucking end and a cutting head, an insert secured to said cutting head, a cutting edge on said insert, said cutting edge including at least one sharp cutting edge portion, a rake surface adjacent said at least one cutting edge portion, said rake face at a rake angle, said rake angle in the range of from −10° to about 10°;

a clearance face adjacent said at least one cutting edge portion opposing said rake face, said clearance face being on an angle from about 24° to 40° and said sharp cutting edge portion defined by an edge radius between said rake face and clearance face, said edge radius having a desired radius.

\* \* \* \* \*